United States Patent
Yokota et al.

(10) Patent No.: US 7,360,832 B2
(45) Date of Patent: Apr. 22, 2008

(54) IMPACT ABSORPTION STRUCTURE OF VEHICLE SEAT

(75) Inventors: Masaaki Yokota, Akishima (JP); Masamitsu Minai, Akishima (JP)

(73) Assignee: Tachi-S Co. Ltd., Tokyo (JP)

( * ) Notice: Subject to any disclaimer, the term of this patent is extended or adjusted under 35 U.S.C. 154(b) by 156 days.

(21) Appl. No.: 11/330,357

(22) Filed: Jan. 12, 2006

(65) Prior Publication Data

US 2007/0158983 A1    Jul. 12, 2007

(51) Int. Cl.
*B60N 2/42* (2006.01)
(52) U.S. Cl. .............. 297/216.16; 297/216.1
(58) Field of Classification Search ............ 297/216.1, 297/216.15, 216.16, 216.18; 248/548, 564, 248/429
See application file for complete search history.

(56) References Cited

U.S. PATENT DOCUMENTS

| | | | |
|---|---|---|---|
| 3,578,376 A * | 5/1971 | Hasegawa et al. ......... 296/68.1 |
| 3,669,397 A * | 6/1972 | Le Mire ..................... 248/371 |
| 4,676,556 A * | 6/1987 | Yamanoi et al. ............ 297/473 |
| 5,152,578 A * | 10/1992 | Kiguchi .................. 297/216.16 |
| 5,730,412 A * | 3/1998 | Shrock ........................ 248/429 |
| 5,967,604 A * | 10/1999 | Yoshida et al. ........ 297/216.19 |
| 6,176,543 B1 * | 1/2001 | Nawata et al. ............. 296/68.1 |
| 6,709,053 B1 * | 3/2004 | Humer et al. ............ 297/216.1 |

FOREIGN PATENT DOCUMENTS

| JP | 07-0132767 | 5/1995 |
|---|---|---|
| JP | 2002-012072 | 1/2002 |

\* cited by examiner

*Primary Examiner*—Joe Edell
(74) *Attorney, Agent, or Firm*—Browdy and Neimark, P.L.L.C.

(57) ABSTRACT

Impact absorption structure is provided in side frame element of seat cushion frame, wherein the side frame element is basically of a closed cross-section portion therein, including forward and backward support points therein. In the structure, an opened cross-section area is defined in the closed cross-section by forming a cut-away portion in a lower part of a forward local region of such closed cross-section portion between the forward and backward support points, so that the opened cross-section area is deformable at said cut-away portion by a great load transmitted from a seat back frame thereto, thereby absorbing a corresponding impact.

4 Claims, 2 Drawing Sheets

IMPACT ABSORPTION STRUCTURE OF VEHICLE SEAT

BACKGROUND OF THE INVENTION

1. Field of the Invention

The present invention relates to an impact absorption structure of vehicle seat which is so designed that a local part of seat frame is deformable to absorb an impact caused by a great load applied to the seat in the case of a rear-end collision, or in the case of a backward collision wherein, when a vehicle runs backwardly, a backward side of vehicle collides with something hard or other vehicle.

2. Description of Prior Art

When a rear-end collision or a backward collision defined above occurs to a vehicle, a great load is applied from a seat occupant to a seat in the vehicle in a backward direction, thus creating a corresponding great impact to a whole of the seat. That is, a great impact thus created is transmitted from a seat back of the seat through an upper body portion of an occupant sitting on the seat and imparted to the seat.

Normally, the vehicle seat itself is formed by robust seat frames sufficient to withstand such impact load, for which reason, the load or impact is transmitted straight through the seat frames and intensively exerted upon a relatively vulnerable portion of mechanical part provided in the seat frames, such as seat adjustment devices including a linkage of seat height adjustment mechanism. In that case, it is highly possible that the mechanical parts or linkage of such seat height adjustment device or a connection portion between the seat cushion frame and a floor will be damaged or broken.

In order to solve the forgoing problem, a deformable area is defined in a particular point in the seat frame to effectively absorb the impact and prevent an extensive exertion of the impact on foregoing linkage or the connection portion of seat adjustment mechanism provided between the seat cushion frame and floor.

One example of such shock absorption arrangement is found from the Japanese Laid-Open Patent Publication No. 7-132767, which teaches a vehicle seat structure wherein a side frame member of the seat back thereof is provided with a deformable area at a predetermined point therein, so that the deformable area will be deformed by an impact load applied to the seat back, to thereby absorb most of the impact load.

However, in this shock absorption structure of seat-back side frame members, it is difficult to adjust and define the deformable area in an optimum size for each different seat back, and further, there is no disclosure for provision of means for limiting backward inclination of the seat back in the case of the deformable area being deformed to allow such backward inclination. Hence, it is more likely than not that the seat back will be subjected to excessive backward inclination in a collision case.

On the other hand, as disclosed by the Japanese Laid-Open Patent Publication No. 2002-12072, the foregoing locally deformable arrangement is provided in a side frame member of seat cushion frame to effectively absorb the impact load. According to this prior art, the side frame member is connected with a seat slide device and a sector-like deformable area is defined in an accordion fashion in the upper flange portion of the side frame member. With this arrangement, in a backward collision case, the connection point between the side frame member and the seat slide device serves to limit excessive deformation of the seat cushion side frame section as well as excessive backward inclination of the seat back, and also, the sector-like deformable area is deformed to absorb the impact load.

Incidentally, there is known a low-type seat cushion frame which is reduced in height to lower a position of buttock portion of an occupant on the seat cushion frame. This type of seat is, in most cases, a so-called slide seat which is provided with a slide device at the bottom side thereof to permit its fore-and-aft movement. In this particular sort of seat, each side frame member of the seat cushion frame is naturally reduced in its height-wise thickness and therefore decreases its rigidity. For that reason, typically, the side frame member per se is formed by four walls so as to have a closed cross-section to increase its rigidity.

With regard to the Japanese Pub. No. 2002-12072, the side frame member thereof is basically formed by four walls to have the above-described closed cross-section structure, but an upper wall is partly opened in the four walls of the side frame member due to the sector-like deformable area being formed in an accordion fashion in the upper flange portion. Such shock absorption structure is defective in that the thus-processed flange portion of the side frame member does not serve its reinforcing and protection functions. That is, the deformable region given in the upper flange portion of side frame member is found defective in decreasing its reinforcement for the upper side of the side frame member itself and does not protect the adjacent trim cover and padding of seat cushion.

SUMMARY OF THE INVENTION

In view of the above-stated drawbacks, it is a purpose of the present invention to provide an improved impact absorption structure of vehicle seat which is simplified in structure and directly applicable to a closed cross-section of side frame member of seat cushion frame In order to achieve such purpose, in accordance with the present invention, there is basically provided an impact absorption structure for vehicle seat, wherein the vehicle seat includes a seat cushion frame and a seat back frame, the seat cushion frame having at least one side frame member provided laterally thereof, wherein such at least one side frame member is supported at a forward support point provided forwardly of and below the vehicle seat, while being also supported at a backward support point provided backwardly of and below the vehicle seat, the impact absorption structure comprising;

a closed cross-section portion defined in the at least one side frame member within a predetermined range between the forward support point and a backward portion of the at least one side frame member, wherein the backward portion faces to a side backwardly of the vehicle seat and includes the backward support point therein;
and
an opened cross-section area defined by forming a cut-away portion in a lower part of a forward local region of the closed cross-section portion between the forward and backward support points, wherein the lower part faces to a side downwardly of the vehicle seat and the forward local region faces to a side forwardly of the vehicle seat,
wherein, the opened cross-section area is deformable at the cut-away portion by a great load transmitted from the seat back frame thereto, thereby absorbing a corresponding impact.

As one aspect of the present invention, the foregoing at least one side frame member may comprise: an outward wall element facing to a side outwardly of the seat cushion frame; and an inward wall element facing to a side inwardly of the seat cushion frame, wherein the outward and inward wall elements are integrally connected with each other so as to have the closed cross-section portion defined therein, and wherein the cut-away portion is formed in a local area of the inward wall element which corresponds to the lower part associated with the closed cross-section, thereby having the opened cross-section area in the local area, whereby the local area of the inward wall element is deformable by the great load at the cut-away portion in a direction outwardly of the seat cushion frame, thereby absorbing the corresponding impact.

The cut-away portion may be formed in such a manner as to be sloped downwards in a direction backwardly of the seat cushion frame in accordance with a moment which is generated between the forward and backward support points by the great load applied to the seat back frame, such that the moment become larger in a direction to the backward support point, while becoming small in direction to the forward support point.

As another aspect of the invention, a bent area may be formed in the opened cross-section portion of the at least one side frame member in such a manner that a forward portion of the at least one side frame member extends from the bent area in a direction forwardly of the vehicle seat on a side inwardly of the seat cushion frame, while by contrast, a backward portion of the at least one side frame member extends from the bent area in a direction backwardly of the vehicle seat on a side outwardly of the seat cushion frame in a parallel relation with the forward portion, hence establishing an offset and parallel relation between the forward and backward portions of the at least one side frame member with respect to the bent area, whereby the opened cross-section area is deformable only in the bent area by the great load, thereby absorbing the corresponding impact therein.

Other features and advantages will become apparent from reading of the description, hereinafter, with respect to the annexed drawings.

DETAILED DESCRIPTION OF PREFERRED EMBODIMENT OF THE PRESENT INVENTION

Referring to FIGS. 1 to 6, there is illustrated a preferred embodiment of impact absorption structure of vehicle seat, as generally designated by (10), in accordance with the present invention.

Figure 1:
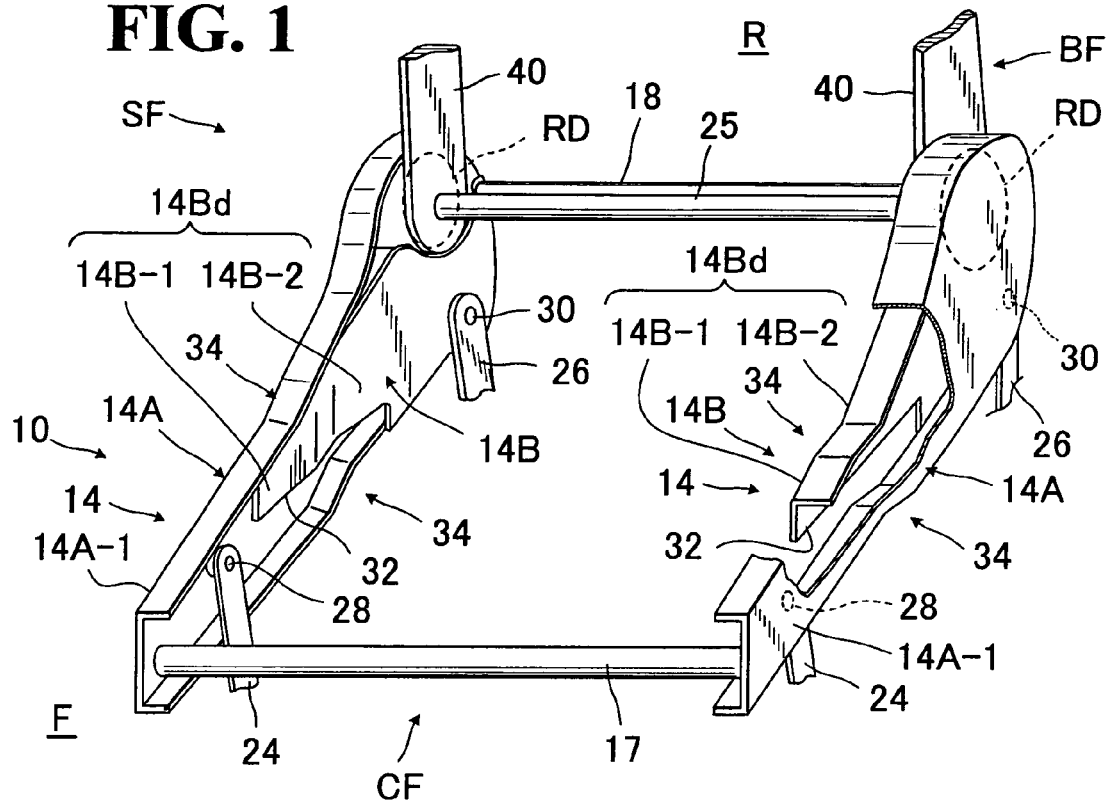
FIG. 1 is a partly broken schematic perspective view of a seat framework to which an impact absorption structure of the present invention is applied.

FIG. 1 shows, in perspective, a seat framework (SF) used in this particular embodiment, which is intended for better understanding of the present invention, but it has to be upheld to form a vehicle seat (22). Hence, it is to be understood that the seat framework (SF) corresponds to a vehicle seat (22) to which the present invention is applied. The seat framework (SF) typically comprises: a seat back frame (BF) corresponding to a seat back (20) of the vehicle seat; and a seat cushion frame (CF) corresponding to a seat cushion (16) of the vehicle seat, with a pair of known reclining devices (RD) (RD) operatively provided between those two frames (BF) (CF) for allowing for adjustable inclination of the seat back. Designation (25) denotes a connecting rod operatively connected with those two reclining devices (RD).

The seat back frame (BF) includes a pair of side frame members (40) (40) and a lower frame member (18).

It is noted that the term, "forward" or "forwardly," refers to a forward side (FW) of the seat framework (SF) or vehicle seat, and the term, "backward" or "backwardly," refers to a backward side (RW) of the seat framework (SF) or vehicle seat. Also, it is noted that, hereinafter, the term "inward" or "inwardly," refers to an inward side (I) facing to an inward side facing to a side inwardly of the seat cushion frame (CF), whereas the term, "outward" or "outwardly," refers to an outward side (O) facing to a side outwardly of the seat cushion frame (CF).

The seat cushion frame (CF) is depicted in FIG. 1 as basically comprising: a pair of side frame members (14) (14); a forward frame member (17); and a backward frame member (18).

Although not shown, a plurality of sinuous springs are extended between the two side frame members (40) of seat back frame (BF) as well as between the forward and backward frame members (17) (18) of seat cushion frame (CF), as a known resilient support element.

Figure 2:
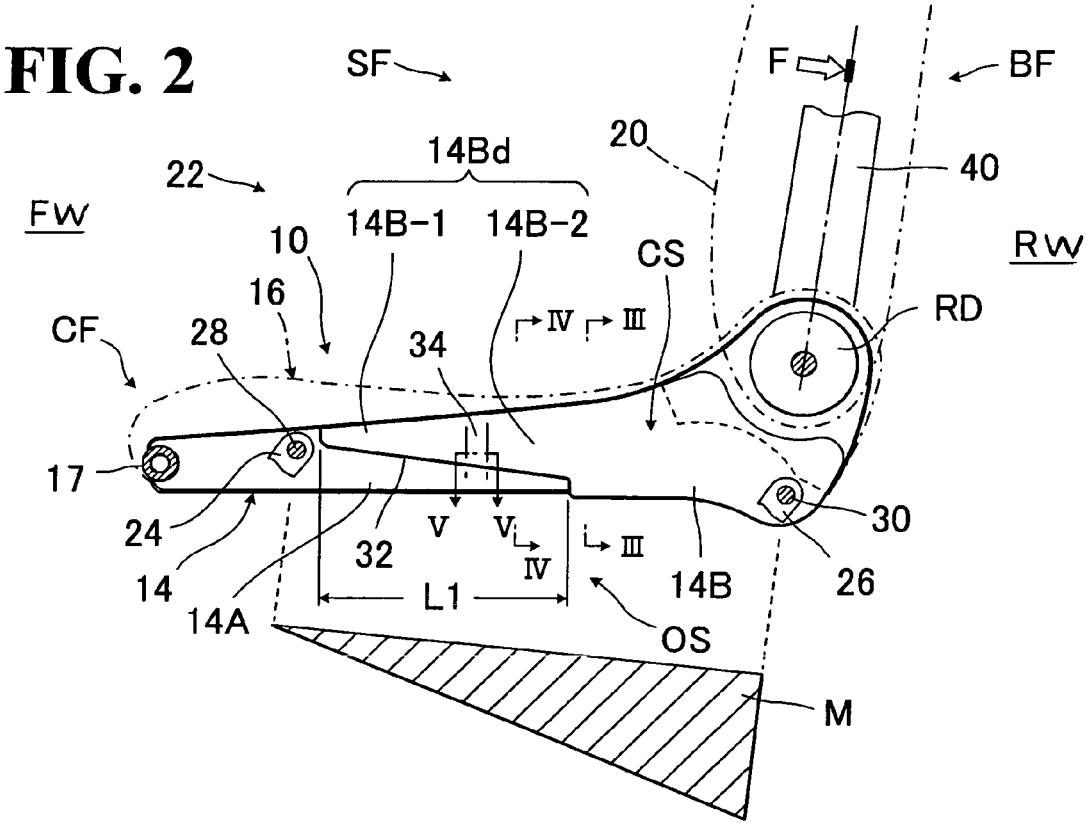
FIG. 2 is a partly broken schematic side view showing a principal part of the impact absorption structure.

Designations (24) and (26) denote a forward link member and a backward link member, respectively, which are a part of a known seat lifter mechanism (not shown). As shown in FIGS. 1 and 2, the forward and backward link members (24) (26) are pivotally connected with each of the two side frame members (14). Specifically, the forward link member (24) is at the upper end thereof rotatably connected via a forward shaft (28) with the forward region of the side frame member (14), whereas on the other hand, the backward link member (26) is at the upper end thereof rotatably connected via a backward shaft (30) with the backward region of the side frame member (14). While not shown, both two lower ends respectively of the forward and backward link members (24) (26) are pivotally connected with a seat adjustment mechanism, such as a slide device, which is fixed on a floor. As the seat lifter mechanism itself, expecting those link members, is not the subject matter of the present invention, any further description thereon is omitted for the sake of simplicity of description.

In this regard, it is seen that the forward shaft (28) and backward shaft (30) constitute a forward support point and a backward support point for the seat cushion frame (14), respectively, which form one constitute element of the present invention, as will be described later.

Figure 3:
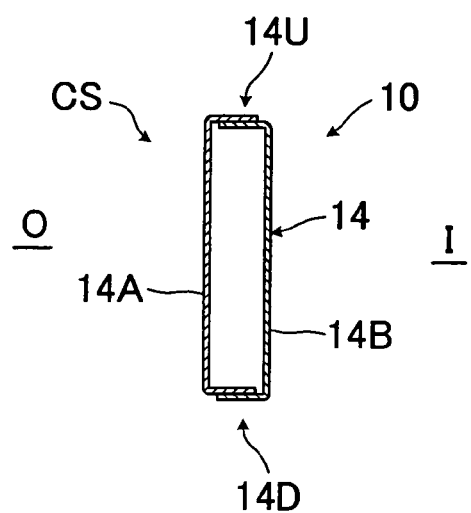
FIG. 3 is a sectional view taken along the line III-III in the FIG. 2.
Figure 4:
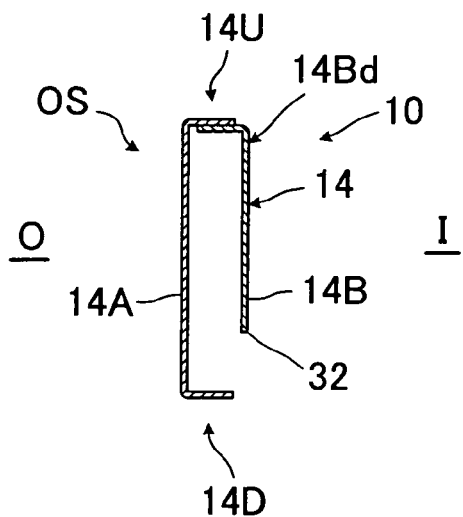
FIG. 4 is a sectional view taken along the line IV-IV in the FIG. 2.

As is known in the art, each side frame member (14) of seat cushion frame (CF) is basically formed by an outward vertical frame element (14A) and an inward vertical frame element (14B) into a closed cross-section, as seen in FIG. 3. That is, each of the outward and inward vertical frame elements (14A) (14B) is of a channel section having upper and lower horizontal sections. In brief, the two vertical frame elements (14A) (14B) are fixed together by welding their respective upper and lower horizontal sections together so as to substantially form a closed cross-section forming a first portion of side frame member (14), wherein the thuswelded horizontal sections of the two vertical frame portions (14A) (14B) form an upper wall portion (14U) and a lower wall portion (14D) of the side frame member (14) as illustrated. Hereinafter, the outward and inward vertical frame elements (14A) (14B) shall be referred to as "outward vertical wall portion (14A)" and "inward vertical wall portion (141B)", respectively, for better understanding. Hence, the outward and inward vertical wall portions (14A) (14B) and the upper and lower wall portions (14U) (14D) basically constitute the illustrated rectangular closed cross-section of side frame member (14).

With the foregoing generation of movement (M) in view, in accordance with the present invention, generically stated, the side frame member (14), which is basically of closed cross-section as stated earlier, is formed such that the backward region thereof in the vicinity of the backward support point (at 30) remains of the above described closed cross-section to provide a strength sufficient to withstand the impact to be imparted directly from the seat back frame (BF) due to the backward load (F), whereas on the other hand, the forward region thereof, which not exceeds the forward support point (at 28), is of an opened cross-section forming a second portion of side frame member (14) to reduce its strength so as to be deformable for impact absorption purpose.

More specifically, as shown in FIG. 2, the backwardly and gently sloped cut-away portion (32) is formed at a limited local area (L1) in the inward vertical wall portion (14B). In that local area (L1), the cut-away portion (32) extends from the forward end of the inward vertical wall portion (14B), which is adjacent to the forward support point (at 28), in a downwardly and gently sloped manner toward the backward support point (at 30) and terminates at a substantially midway point between the forward and backward support points (28) (30). This arrangement efficiently absorbs the impact within a small area in compliance with such backwardly divergent generation of moment (M) which becomes smaller as it proceeds from the backward support point (at 30) to the forward support point (at 28). Namely, given such backwardly and gently sloped cut-away portion (32), the inward vertical wall portion (14B) is provided with a backwardly divergent local region (14Bd) in the forward portion thereof. Such local region (14Bd) has a reduced area (14B-1) and an increased area (14B-2) which are to be deformed within the limited area (L1) in accordance with the backwardly divergent state of moment (M), thereby absorbing most of the impact caused by the great backward load (F), with high efficiency, in a rear-end or backward collision, and thus preventing an intensive exertion of the impact on the backward shaft (30).

Figure 6:
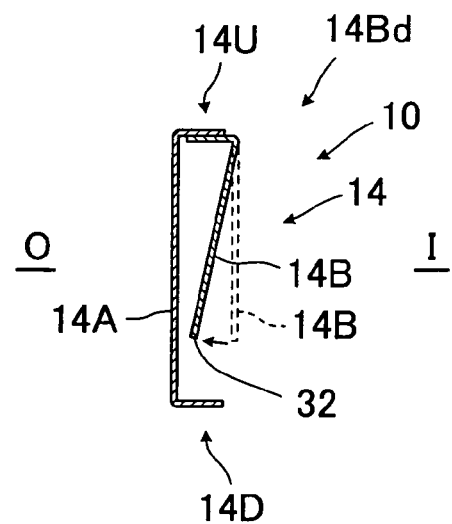
FIG. 6 is sectional view for explanatorily showing how an inward wall portion of side frame member is deformed.

With such structure, as shown in FIG. 6, when a great load (F) is applied to the seat back frame (BF), the backwardly divergent local region (14Bd) of the inward vertical wall portion (14B) is deformed in a direction to the outside (0). Due to such deformation, it is appreciated that (i) any damage is not given to a seat occupant as well as to a trim cover and padding of the seat cushion (16), and (ii) a corresponding impact created by the load (F) is dispersed widely in a whole of such local region (14Bd) and effectively absorbed, thereby insuring not only to prevent the backward shaft (30) against deformation or breakage, but also to prevent an extensive exertion of the impact on a small point of the inward vertical wall portion (14B), thereby insuring to prevent the side frame member (14) against excessively large deformation.

Figure 5:
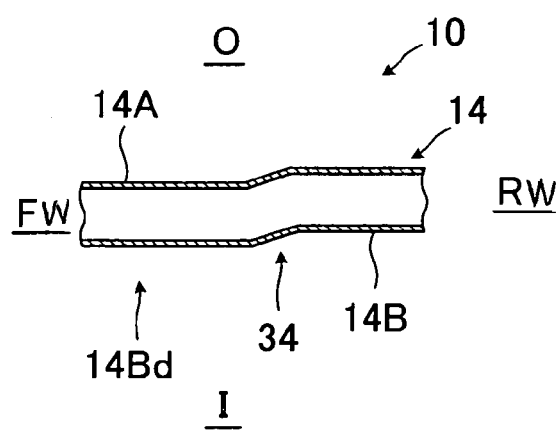
FIG. 5 is a sectional view taken along the line V-V in the FIG. 2.

In accordance with the present invention, as indicated by the designation (34), a bent area may be formed in both of the outward and inward vertical wall portions (14A) (14B), within the opened cross-section portion (OS), such that, as shown in FIG. 5, both forward portions respectively of the two vertical wall portions (14A) (14B) are in an offset and parallel relation with both backward portions respectively of the two vertical wall portion (14A) (14B) with respect to the bent area (34). In other words, as seen in FIG. 5, the outward and inward vertical wall portions (14A) (14B) are bent at their respective localized area (at 34) toward the inward side (I) in a parallel relation with each other, such that the two vertical wall portions (14A) (14B) extend forwardly on the inward side (I) from such local bent area (34), while extending backwardly on the outward side (O) from that local bent area (34), thus establishing an offset and parallel relation between the outward and inward vertical wall portions (14A) (14B) with respect to the local bent area (34). With this arrangement, if the great load (F) is transmitted from the seat back frame (BF) to the side frame member (14), a corresponding impact is exerted only upon a very small local area of the inward vertical wall portion (14B) which corresponds to such local bent area (34), as a result of which, that particular small local area of inward vertical wall portion (14B) is deformed toward the outward side (O) in substantially the same manner as shown in FIG. 6, thereby absorbing the impact to prevent deformation or breakage of the backward shaft (30).

While having described the present invention so far, it should be understood that the invention is not limited to the illustrated embodiment, but any other modification, replacement and addition may be applied thereto without departing from the appended claims. For example, (i) the aforementioned cut-away portion (32) may be formed in the outward vertical wall portion (14A) to define the opened cross-section area of the side frame member (14). and (ii) that cut-away portion (32) itself be formed in a horizontally rectilinear manner, instead of the afore-stated backwardly sloped manner. Further, the impact absorption structure of the present invention is basically applied to a front seat, but it may be applied to a rear seat.

What is claimed is:

1. An impact absorption structure for a vehicle seat, wherein said vehicle seat includes a seat cushion frame and a seat back frame, said seat cushion frame comprising at least one side frame member having an outer wall facing outward from said seat cushion and an inner wall facing inward toward said seat cushion, said side frame member supported at a forward support point provided forward of and below said vehicle seat and supported at a backward support point provided backward of and below said vehicle seat, said impact absorption structure comprising:
    a first portion located forward of said backward support point formed by said outer wall and said inner wall integrally engaged together at top and bottom ends thereof to provide an enclosed cross-sectional space along a length of said first portion;
    a second portion contiguous and forward of said first portion formed by said outer wall and said inner wall integrally engaged together only at the upper ends thereof along a length of said side frame member;
    wherein a cut-away portion is located at a bottom end of the inner wall to provide an open cross-section space along a length of said second portion,
    wherein, said opened cross-section area is deformable at said cut-away portion by a great load transmitted from said seat back frame thereto, thereby absorbing a corresponding impact.

2. The impact absorption structure as claimed in claim 1, wherein said cut-away portion is formed in such a manner as to be sloped downwards in a direction toward said first portion in accordance with a movement which is generated between said forward and backward support points by said great load applied to said seat back frame, such that the moment becomes larger in a direction to said backward support point, while becoming smaller in a direction to said forward support point.

3. The impact absorption structure as claimed in claim 2, wherein the inner wall and the outer wall in said second portion are laterally bent so that a forward portion of said at least one side frame member extends from an area of said bent in a direction toward said forward support point, while by contrast, a backward portion of said at least one side frame member extends from the area of said bent in a direction backward toward said backward support point in a parallel relation with said forward portion, wherein an offset and parallel relation is established between said forward and backward portion of said at least one side frame member with respect to the area of said bent, wherein said second portion is deformable only at the area said bent by said great load, thereby absorbing the corresponding impact therein.

4. The impact absorption structure as claimed in claim 1, wherein the inner wall and the outer wall in said second portion are laterally bent so that a forward portion of said at least one side frame member extends from an area of said bent in a direction toward said forward support point, while by contrast, a backward portion of said at least one side frame member extends from the area of said bent in a direction backward toward said backward support point in a parallel relation with said forward portion, wherein an offset and parallel relation is established between said forward portion and backward portion of said at least one side frame member with respect to the area of said bent, wherein said second portion is deformable only at the area of said bent by said great load, thereby absorbing the corresponding impact therein.

* * * * *